Mar. 3, 1925.

A. A. MARTELL 1,528,558

METHOD OF MAKING REAMERS AND THE LIKE

Filed March 17, 1921

Inventor
Albert A. Martell
George Ramsey
his Attorney

Patented Mar. 3, 1925.

1,528,558

UNITED STATES PATENT OFFICE.

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

METHOD OF MAKING REAMERS AND THE LIKE.

Application filed March 17, 1921. Serial No. 453,192.

*To all whom it may concern:*

Be it known that I, ALBERT A. MARTELL, a citizen of the United States, residing at Woonsocket, in the county of Providence, State of Rhode Island, have invented certain new and useful Improvements in Methods of Making Reamers and the like, of which the following is a specification.

The principal object of the present invention is a reamer of the bottom reamer type wherein blades are clamped the full length of the body portion of the reamer.

Another object of the present invention is a reamer of the character specified and wherein clamp plates are arranged to act on one side of each reamer blade to establish inward and circumferential forces throughout the length of the blades to clamp the same in position.

Another object of the present invention is a reamer of the character specified and wherein clamp blocks are provided between pairs of blades in such manner that the sides of the clamp blocks are parallel to the opposite sides of grooves in the reamer body and whereby the blades are clamped throughout their entire length against detachable wedge supports in the bottom of the grooves so that a suitable adjustment nut may be utilized to slide the blades on the supports to expand the reamer when the clamps are released.

Another and primary object of the present invention is the method of manufacturing a reamer wherein a body portion is formed and clamp blocks are arranged on the body portion, then blade slots are cut over the side joints between the blocks and the body portion in order to provide parallel sided grooves to receive the blades.

Another object of the present invention is the method of manufacturing reamers as specified and wherein shims or thin strips are utilized beneath the block to clamp tightly against suitable blades when the shims are removed.

A further object of the present invention is the method of manufacturing reamers as specified and wherein the blade grooves are angularly cut over joints which are substantially parallel to the axis of the body portion.

A still further object of the present invention is the method of manufacturing reamers as specified and wherein slots are milled or otherwise cut in a suitable body portion so that the edges thereof are parallel planes and suitable blocks are mounted in the slots, then the blade grooves are formed partly from the edges of the blocks and partly from the body portion of the reamer with the mid-plane of the blade grooves being substantially radial of the body portion.

Other and further objects of the present invention will in part be obvious and will in part be pointed out hereinafter in the specification following wherein like parts are designated by like characters throughout the several figures thereof.

Figure 1:
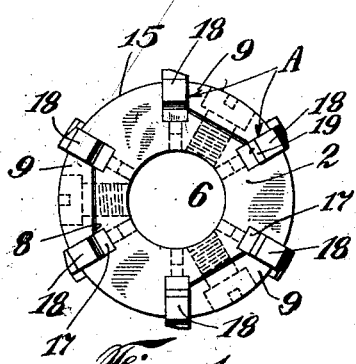
Figure 1 is an end view of a reamer embodying the present invention.
Figure 2:
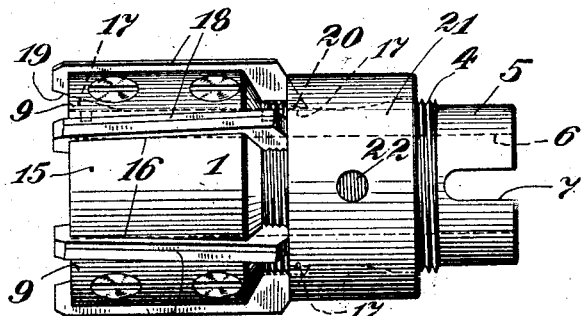
Fig. 2 is a side view of the same reamer.
Figure 3:
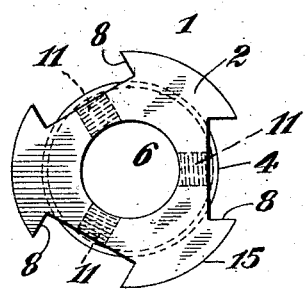
Fig. 3 illustrates an end view of the body portion during one step of manufacture.
Figure 4:
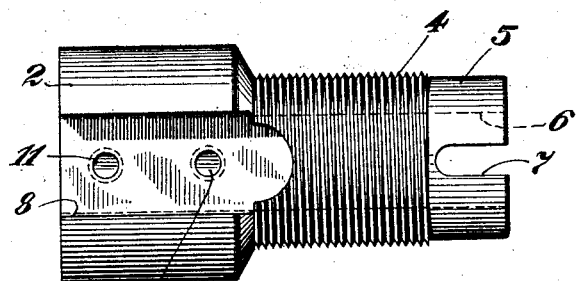
Fig. 4 is a side view of the body portion shown in Fig. 3.
Figure 5:
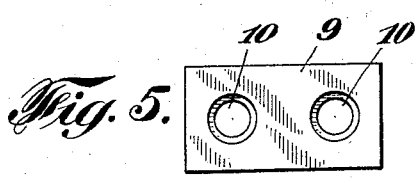
Fig. 5 is a plan view of a finished clamp block.
Figure 6:
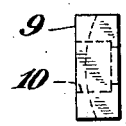
Fig. 6 is an end view of the same block illustrating by dotted lines the shape of the block when finished.

Heretofore in the art it has been customary to manufacture reamers by providing a body portion shaped to receive reamer blades, which were usually locked in position by means of collars which engaged overhanging portions on the blades. Where end reamers were desired it was usual to lock the forward end of the blades in position by means of clamp screws which bore on only a portion of the end of the blade or which clamped only a part of the body portion against the forward end portion of the blade. In other constructions angularly disposed pins were utilized at the outer end of the body portion with half the diameter of the pin in a groove in the blade and the other half in the body portion, and retaining the outer ends of the blades thus held in position. In these constructions it was extremely difficult to secure accuracy of adjustment which would be maintained during the operation of the reamer because the blades were not definitely locked in position throughout their entire length. Furthermore, difficulty was encountered in manufacturing the parts with such accuracy that all portions, and all blades were adjusted to the same extent when adjustments were made.

The present invention overcomes the difficulties of the known art by providing a reamer wherein the blades are clamped throughout their entire length and wherein the parts are manufactured by a method which facilitates accuracy and at the same time is economical. The preferred way in carrying out the method of manufacture of the present reamer is to provide a body portion which is arranged on a suitable mandril, and slots parallel with the axis are then cut in the body portion. These slots preferably have parallel sides so as to fit an ordinary square-sided block. Shims are arranged in the bottoms of the slots and suitable blocks are then provided and are mounted upon the shims in the slots; preferably, by means of machine screws which are threaded into the bottom of the slots. The body portion is again placed in a suitable lathe so that the tops of the blocks may be cut or ground to the cylindrical contour of the body portion. With the blocks now in position the body portion is mounted on a milling machine or the like and if the blades are intended to be angularly disposed the axis of the mandril is inclined, as desired, to the direction of cut. The blade slots are then cut in the body portion of the reamer directly over the edges of the clamp blocks so that a portion of the grooves is cut from the side of the clamp blocks. Where desired the blade grooves may be ground and finished accurately to a definite width and depth. The base of these grooves is then preferably drilled at each end to provide for the reception of adjustment wedges. The clamp blocks are removed and the shims taken from under the blocks, the wedge blocks are set in position, and the blades placed thereon and the clamp blocks again placed in position to assemble the parts. Preferably the inner ends of the blades are inclined and an adjustment nut having an under-cut face abuts the end of the blades so that all of the blades set in corresponding positions on the adjustment wedges.

The method described produces, in an economical way, a very accurate construction wherein the blades are clamped throughout the full length so rigidly that when the machine screws are set with a reasonable degree of tightness it is impossible to move forward the adjustment nut, even though a large spanner wrench is utilized. By releasing the machine screws sufficiently to release the blades and at the same time retain sufficient clamping to prevent the blades from dropping out, the adjustment collar may be adjusted to slide the blades on the wedges and thus set the reamer for predetermined diameters.

Figure 7:
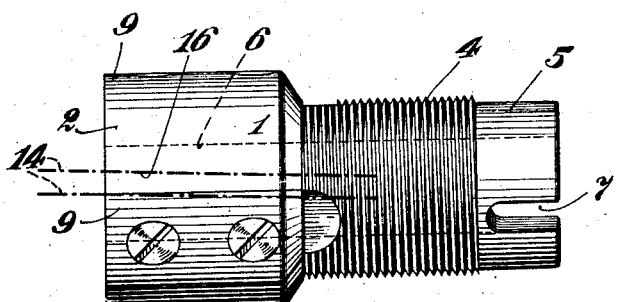
Fig. 7 is a view of the unfinished body portion illustrating the direction of cut for a blade slot.

Referring now to the drawings which illustrate a preferred form of the reamer, the reamer as shown comprises providing a body portion of metal 1 having a relatively large head 2, a threaded portion 4, a shank 5. The body portion may be provided with an opening 6 and the shank may be provided with end slots 7 to receive a driving pin or key on a suitable mandril or arbor which may extend through an opening 6. This head portion is slotted as at 8 with slots having straight parallel sides. Suitable clamp blocks 9 are provided from bar metal and are drilled to form screw openings 10 which preferably are counter-sunk to provide clearance for the heads of suitable machine screws. The body portion is tapped as at 11 to provide screw threads for the machine screws. Relatively the metal shims are placed in the bottom of the slots 8 and the clamp blocks 9 are then placed in position in the slots and securely set down upon the shims. The head is then turned or ground to bring the tops of the clamp blocks to the same cylindrical surface as the remaining portion of the head. The body portion and the blocks are now ready to be cut to provide blade grooves or slots. Preferably these grooves are to be inclined so therefore the arbor supporting the body portion is set at the desired inclination with reference to the path of the cutting tool, which may comprise a suitable milling cutter, as is indicated by dotted lines 14 in Fig. 7. The cut is made over a side joint between the block and the head so that in forming the blade groove metal is cut both from the block and the head. This leaves the body portion with a plurality of ribs 15 thereon. The inclination of the blade grooves 16 preferably is such that the cutting edges of opposite blades are diametrically opposed throughout their length. After all of the blade grooves have been finished the blocks and shims are removed and openings are drilled adjacent the ends of the slots to receive suitable adjustment wedges 17. Carefully formed blades 18 which are provided with inclined surfaces 19 and 20 are placed in position on the wedges 17 and the finished clamp blocks are tightened down against the blades. A screw collar 21 provided with a spanner wrench opening 22 is screw threaded on the part 4 of the body portion in such manner that the undercut forward edge of the collar overhangs the inclined portions at the rear of the blades. The collar, when moved forward, pushes the blades over the inclined wedges which cause an outward movement of the blades, thereby permitting the cutting edges to be set at predetermined diameters.

A reamer constructed in accordance with the foregoing described method is exceedingly rigid when assembled since the clamping action of the clamp blocks 9 is an inward and sidewise action as illustrated by the arrows A in Fig. 1. Because of the method outlined in making the reamer, it follows the blade grooves have parallel sides which engage the blade throughout their entire length and thus a very stable holding surface is provided. In actual practice it has been found that there has been no tendency of the blades of this reamer to loosen while in use and at the same time adjustments may be quickly and accurately made.

The method of manufacture economically produces a reamer capable of withstanding heavy and hard usage.

Having thus described my invention, what I claim is:

1. The method of manufacturing reamers, comprising providing a body portion, cutting large straight slots, in the body portion, mounting blocks in the slots then cutting blade grooves over edges of the blocks with a part of the grooves cut from the blocks and the remaining part cut from the body portion.

2. The method of manufacturing reamers, comprising providing a body portion, cutting large straight slots in the body portion, arranging shims in the bottoms of the slots, mounting blocks in the slots over the shims, then cutting blade grooves over the edges of the blocks with a part of the grooves cut from the blocks and the remaining part cut from the body portion.

3. The method of manufacturing reamers, comprising providing a body portion, cutting large straight slots in the body portion, mounting blocks in the slots, then cutting blade grooves over the edges of the blocks and angularly disposed to the edges of the blocks and with a part of the grooves cut from the blocks and the remaining part cut from the body portion.

4. The method of manufacturing reamers, comprising providing a body portion, cutting large straight slots in the body portion, mounting blocks in the slots, turning the tops of the blocks to the contour of the body portion, then cutting blade grooves over the edges of the blocks with a part of the grooves cut from the blocks and the remaining part cut from the body portion.

5. The method of manufacturing reamers, comprising providing a body portion, cutting large straight slots in the body portion, mounting blocks in the slots, then cutting blade grooves over the edges of the blocks with a part of the grooves cut from the blocks and with the remaining part cut from the body portion, there being twice as many grooves as slots, and with the grooves being radially disposed relatively to the axis of the body portion.

6. The method of manufacturing reamers, comprising providing a body portion, cutting straight slots in the body portion, arranging shims in the bottoms of the slots, mounting blocks in the slots over the shims, then cutting blade grooves over the edges of the blocks and angularly disposed to the edges of the blocks and with a part of the grooves cut from the blocks and the remaining part cut from the body portion.

7. The method of manufacturing reamers, comprising providing a body portion, cutting large straight slots in the body portion, arranging shims in the bottom of the slots, mounting blocks in the slots over the shims, turning the tops of the blocks to the contour of the body portion, then cutting blade grooves over the edges of the blocks and angularly disposed to the edges of the blocks and with a part of the grooves cut from the blocks and the remaining part cut from the body portion there being twice as many grooves as slots, and with the grooves being radially disposed relatively to the axis of the body portion, then setting blades with parallel sides in said slots.

8. The method of manufacturing reamers and the like, which comprises providing a body portion, cutting a plurality of slots in the body portion, securing rectangular blocks in the said slots, then cutting a blade groove over each edge of each block with a portion of the groove cut from the edge of each block and the remaining portion cut from the body portion.

9. The method of manufacturing reamers and the like, which comprises providing a body portion, cutting a plurality of wide parallel sided slots in the body portion, securing rectangular blocks in the said slots, then cutting a blade groove over each edge of each block with a portion of the groove cut from the edge of each block and the remaining portion cut from the body portion.

10. The method of manufacturing reamers and the like, which comprises providing a body portion, cutting a plurality of slots in the body portion, securing rectangular blocks in the said slots, then cutting a narrow radial blade groove over each edge of each block with a portion of the groove cut from the edge of each block and the remaining portion cut from the body portion.

11. The method of manufacturing reamers and the like, which comprises providing a body portion, cutting a plurality of slots in the body portion, securing rectangular blocks in the said slots, then angularly cutting a blade groove over each edge of each block with a portion of the groove cut from the edge of each block and the remaining portion cut from the body portion.

12. The method of manufacturing reamers and the like, which comprises providing a body portion, cutting a plurality of slots in the body portion, securing rectangular blocks in the said slots, then cutting a blade groove over each edge of each block with a portion of the groove cut from the edge of each block, and the remaining portion cut from the body portion, said grooves being in pairs diametrically disposed throughout their length.

13. The method of manufacturing reamers and the like, which comprises providing a body portion, cutting a plurality of wide parallel sided slots in the body portion, securing rectangular blocks in the said slots, then angularly cutting a narrow radial blade groove over each edge of each block with a portion of the groove cut from the edge of each block and the remaining portion cut from the body portion said grooves being in pairs diametrically disposed throughout their length.

14. The method of manufacturing reamers and the like, which comprises providing a body portion, cutting a plurality of slots in the body portion, securing rectangular blocks in the said slots, then angularly cutting a narrow radial blade groove over each edge of each block with a portion of the groove cut from the edge of each block and the remaining portion cut from the body portion.

ALBERT A. MARTELL.